United States Patent
Ito et al.

(10) Patent No.: US 9,005,766 B2
(45) Date of Patent: Apr. 14, 2015

(54) BIAXIALLY-ORIENTED POLYESTER FILM FOR USE AS WRAP-AROUND CONTAINER LABEL, AND WRAP-AROUND CONTAINER LABEL

(75) Inventors: Hideki Ito, Inuyama (JP); Masakazu Iwasaki, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 541 days.

(21) Appl. No.: 13/375,714

(22) PCT Filed: Jun. 1, 2010

(86) PCT No.: PCT/JP2010/059232
§ 371 (c)(1),
(2), (4) Date: Dec. 1, 2011

(87) PCT Pub. No.: WO2010/140575
PCT Pub. Date: Dec. 9, 2010

(65) Prior Publication Data
US 2012/0088112 A1    Apr. 12, 2012

(30) Foreign Application Priority Data

Jun. 5, 2009 (JP) ................. 2009-136513
Jul. 22, 2009 (JP) ................. 2009-171035
Jul. 22, 2009 (JP) ................. 2009-171036

(51) Int. Cl.
| B32B 27/06 | (2006.01) |
| B32B 27/36 | (2006.01) |
| C08G 63/183 | (2006.01) |
| C08L 67/03 | (2006.01) |
| C08K 3/22 | (2006.01) |
| C08K 5/098 | (2006.01) |
| C08K 5/10 | (2006.01) |
| C08K 5/51 | (2006.01) |
| C08K 5/52 | (2006.01) |
| C08K 5/53 | (2006.01) |
| C08J 5/18 | (2006.01) |
| B32B 27/08 | (2006.01) |
| G09F 3/02 | (2006.01) |

(52) U.S. Cl.
CPC .............. *C08J 5/18* (2013.01); *B32B 2305/70* (2013.01); *C08L 67/03* (2013.01); *C08G 63/183* (2013.01); *B32B 2255/00* (2013.01); *C08K 2003/2217* (2013.01); *C08K 2003/2206* (2013.01); *C08K 5/53* (2013.01); *C08K 5/52* (2013.01); *C08K 5/098* (2013.01); *C08K 5/10* (2013.01); *C08K 2201/019* (2013.01); *C08K 5/51* (2013.01); *C08K 3/22* (2013.01); *C08K 2003/2224* (2013.01); *B32B 27/08* (2013.01); *B32B 27/36* (2013.01); *B32B 2250/03* (2013.01); *B32B 2250/244* (2013.01); *B32B 2250/40* (2013.01); *B32B 2255/10* (2013.01); *B32B 2255/24* (2013.01); *B32B 2307/202* (2013.01); *B32B 2307/21* (2013.01); *B32B 2307/518* (2013.01); *B32B 2519/00* (2013.01); *C08J 2367/02* (2013.01); *G09F 2003/0251* (2013.01); *G09F 2003/0273* (2013.01); *Y10S 428/9033* (2013.01); *Y10S 428/91* (2013.01)

(58) Field of Classification Search
None
See application file for complete search history.

(56) References Cited

U.S. PATENT DOCUMENTS

| 4,440,924 | A | * | 4/1984 | Kuze et al. ................... 528/275 |
| 4,604,453 | A | * | 8/1986 | Kuze et al. ................... 528/481 |
| 4,605,591 | A | * | 8/1986 | Nose et al. ................... 428/332 |
| 4,727,108 | A | * | 2/1988 | Kagiyama et al. ........... 524/425 |
| 5,444,144 | A | * | 8/1995 | Tanaka et al. ................ 528/503 |
| 5,567,511 | A | * | 10/1996 | Shih et al. ................. 428/314.8 |
| 5,770,317 | A | * | 6/1998 | Takaya et al. ................ 428/480 |
| 6,136,420 | A | * | 10/2000 | Hibiya et al. ................ 428/213 |
| 6,365,659 | B1 | * | 4/2002 | Aoyama et al. .............. 524/399 |
| 6,500,915 | B1 | * | 12/2002 | Fujimori et al. ............. 528/279 |
| 6,517,762 | B1 | * | 2/2003 | Tsunekawa et al. ........ 264/290.2 |
| 6,703,138 | B1 | * | 3/2004 | Taki et al. .................... 428/483 |
| 6,828,010 | B2 | * | 12/2004 | Kubota et al. ............... 428/213 |
| 6,855,758 | B2 | * | 2/2005 | Murschall et al. ........... 524/195 |
| 7,132,383 | B2 | * | 11/2006 | Nakajima et al. ............ 502/150 |
| 7,344,765 | B2 | * | 3/2008 | Hayakawa et al. .......... 428/34.9 |
| 7,501,373 | B1 | * | 3/2009 | Nakajima et al. ............ 502/150 |
| 7,524,920 | B2 | * | 4/2009 | Pecorini et al. .............. 528/272 |
| 7,544,762 | B2 | * | 6/2009 | Yamamoto et al. .......... 528/279 |
| 7,790,272 | B2 | * | 9/2010 | Osada et al. ................. 428/212 |

(Continued)

FOREIGN PATENT DOCUMENTS

| JP | 59-064628 A | 4/1984 |
| JP | H02-214733 A | 8/1990 |

(Continued)

OTHER PUBLICATIONS

Database WPI, Week 200410, Thomson Scientific, London, GB, Accession No. 2004-093445 (Mar. 2004) [referencing JP 2003-138112 A (Toyobo Kabushiki Kaisha) (May 14, 2003)].
European Patent Application, Extended European Search Report in European Patent Application No. 10783358.4 (Oct. 17, 2013).
Japanese Patent Office, International Search Report in International Patent Application No. PCT/JP2010/059232 (Sep. 21, 2010).
Japanese Patent Office, Notice of Reasons for Rejection in Japanese Application No. 2011-065668 (Jun. 3, 2014).
Japanese Patent Office, Notice of Reasons for Rejection in Japanese Patent Application No. 2010-529164 (Aug. 12, 2014).

*Primary Examiner* — Vivian Chen
(74) *Attorney, Agent, or Firm* — Leydig, Voit & Mayer, Ltd.

(57) ABSTRACT

The invention provides a biaxially-oriented polyester film that comprises a biaxially oriented polyethylene terephthalate film and contains 9000 ppm or less of ethylene terephthalate cyclic trimer, has a molten specific resistance of within $1.0 \times 10^8 \Omega \cdot cm$, and at least one surface of the film has a surface resistivity of 13 log $\Omega$ or less under a relative humidity of 65 %. The invention also provides a wrap-around label for a container produced from the film.

14 Claims, No Drawings

(56) References Cited

U.S. PATENT DOCUMENTS

| | | | |
|---|---|---|---|
| 7,915,374 B2 * | 3/2011 | Jenkins et al. | 528/180 |
| 8,063,122 B2 * | 11/2011 | Otto et al. | 524/115 |
| 8,299,158 B2 * | 10/2012 | Honma et al. | 524/323 |
| 2002/0058132 A1 * | 5/2002 | Mueller et al. | 428/220 |
| 2003/0039852 A1 * | 2/2003 | Okumura et al. | 428/482 |
| 2003/0064236 A1 * | 4/2003 | Mueller et al. | 428/480 |
| 2004/0130059 A1 * | 7/2004 | Kern et al. | 264/173.16 |
| 2004/0236063 A1 * | 11/2004 | Suzuki et al. | 528/275 |
| 2006/0035070 A1 * | 2/2006 | Kitazawa et al. | 428/323 |
| 2006/0270806 A1 * | 11/2006 | Hale | 525/439 |
| 2007/0106055 A1 * | 5/2007 | Kageyama et al. | 528/274 |

FOREIGN PATENT DOCUMENTS

| | | | |
|---|---|---|---|
| JP | 04-028728 | * | 1/1992 |
| JP | 04-0238728 | * | 1/1992 |
| JP | 05-150724 A | | 6/1993 |
| JP | 51-050724 A | | 6/1993 |
| JP | 07-138388 A | | 5/1995 |
| JP | 09-296056 | * | 11/1997 |
| JP | 11-092637 | * | 4/1999 |
| JP | 2000-212301 A | | 8/2000 |
| JP | 2001-348425 | * | 12/2001 |
| JP | 2002-327053 A | | 11/2002 |
| JP | 2003-041021 | * | 2/2003 |
| JP | 2003-105106 | * | 4/2003 |
| JP | 2003-165832 | * | 6/2003 |
| JP | 2004-137356 | * | 5/2004 |
| JP | 2004-137356 A | | 5/2004 |
| JP | 2004-269601 | * | 9/2004 |
| JP | 2006-096791 | * | 4/2006 |
| JP | 2006-152076 A | | 6/2006 |
| JP | 2006-249213 | * | 9/2006 |

* cited by examiner

BIAXIALLY-ORIENTED POLYESTER FILM FOR USE AS WRAP-AROUND CONTAINER LABEL, AND WRAP-AROUND CONTAINER LABEL

CROSS-REFERENCE TO RELATED APPLICATION(S)

This application is the U.S. national phase of International Patent Application No. PCT/JP2010/059232, filed on Jun. 1, 2010.

TECHNICAL FIELD

The present invention relates to a biaxially-oriented polyester film. More specifically, a first invention relates to a biaxially-oriented polyester film for use as a wrap-around container label, which includes a polyester with low oligomer content and can be produced without causing any loss of productivity and quality of the film. A second invention relates to a biaxially-oriented polyester film for use as a wrap-around container label, which causes no loss of quality of the film, includes a polyester with low oligomer content, and is not prone to problems due to static electricity.

BACKGROUND ART

Having excellent mechanical properties and chemical resistance, aromatic polyesters typified by polyethylene terephthalate (PET) have been used widely as fibers and molded products such as films. Especially, being economical and excellent in terms of sanitary, a PET resin has been used widely as food containers, particularly, beverage containers. These containers are commonly referred to as "PET bottle" and their consumption quantity is immense. Further, from the viewpoint of an increase in recent concern on environmental issues and saving of resources, regarding used beverage PET bottles, recycling has been promoted so far. Its application method has drawn attention.

A film including PET is produced, in general, by melt-extruding PET out of a cap, obtaining an undrawn film by quenching the extruded film-like melt on a rotating cooling drum surface, and successively, drawing the undrawn film in longitudinal and width directions. In this case, in order to eliminate surface defects and to enhance the thickness evenness of the film, the adhesiveness between the film-like melt and the surface of the rotating cooling drum needs to be improved.

In order to solve the problem, at the time of quenching an extruded sheet-like object melt-extruded out of an extrusion cap on the surface of a rotating cooling drum, it is required to improve the adhesiveness between the sheet-like object and the drum surface. As a method for improving the adhesiveness between the sheet-like object and the drum surface, a method (an electrostatic adhesion casting method) is effective in which a wire-like electrode is installed between the extrusion cap and the rotating cooling drum, high voltage is applied, static electricity is generated on the uncured sheet-like object surface, and the sheet is quenched while the sheet is attached to the cooling body surface.

In order to efficiently carry out the electrostatic adhesion casting method, in other words, it is required to improve the electrostatic adhesiveness between the sheet-like object and the drum surface, and because of this, how high quantity of electric charge can be generated on the sheet-like surface is important. In order to increase the electric charge, it is effective to lower the specific resistance of a polyester by modifying the polyester, and good deal of effort has been made.

For example, it is disclosed that the specific resistance is lowered by adding a magnesium compound and a phosphorus compound in a manner of adjusting the atomic ratio of magnesium atoms and phosphorus atoms in a specified range at the time of producing PET (see Patent Document 1). According to the above-mentioned document, it is disclosed that foreign materials derived from a catalyst can be decreased and also the quality of a film can be improved by specifying the timing of addition of a magnesium compound, a sodium compound, and a phosphorus compound.

On the other hand, it is not originally intended to use PET reproduced from recycled PET bottles for films and therefore, the PET has a high specific resistance value and is indispensably necessary to be modified for improvement of electrostatic adhesiveness in terms of film productivity.

Furthermore, recycled PET bottles tend to be polluted and contaminated easily with foreign materials such as attached labels, printing inks used for the attached labels, and dust attached to the bottles, and in the case of production of films from starting materials derived from the recycled PET bottles, these foreign materials become defects and cause loss of quality of the films and consequently, it may probably result in inferior appearance in the case where the films are used as a wrap-around beverage PET bottle label. Consequently, in the case of such products, the meaning of saving a resource is possibly lessened, and development of products which reduce load on environments without lowering their quality has been increasing (see Patent Document 2).

Moreover, there is another problem that being an insulator, a conventional film tends to generate and accumulate static electricity. The static electricity is a cause of problems at the time of processing, for example, it causes a problem of wrapping of the film around a roll, generating shock on the human body with which the film is brought into contact, or making it difficult to handle the film to lower the workability in production step or in secondary processing step such as printing, adhesion, and the like. Further, it becomes a cause of, so-called, generation of thin lines at printing, inferior of attachment property after label formation from the film, or stains of the film surface, and it accordingly lowers the product value.

PRIOR ART DOCUMENTS

Patent Documents

Patent Document 1: Japanese Unexamined Patent Publication No. S 59-64628 (CLAIMS, and the like)

Patent Document 2: Japanese Unexamined Patent Publication No. H 7-138388 (Paragraph Nos. 0001 to 0005, and the like)

SUMMARY OF THE INVENTION

Problems to be Solved by the Invention

The invention has been completed, based on the problems of conventional techniques. That is, an object of a first invention of the present invention is to provide a biaxially-oriented polyester film for use as a wrap-around container body label for beverages, which comprises a polyester having low oligomer content, causes no loss of productivity and quality of the film, and is not likely to cause problems due to static electricity.

Further, an object of a second invention of the present invention is to provide a biaxially-oriented polyester film for use as a wrap-around container body label for beverage, which includes a polyester with low oligomer content, causes no loss of quality of the film, and is not prone to problems due to static electricity.

Solutions to the Problems

The inventors of the invention have made various investigations and consequently, found that the above-mentioned problems can be solved by the following means and the findings have led to the present invention.

That is, the invention has the following constitutions;
1. A biaxially-oriented polyester film for use as a wrap-around container label, wherein the film is a biaxially-oriented polyethylene terephthalate film, a content of ethylene terephthalate cyclic trimer in the film is 9000 ppm or less, a molten specific resistance at a temperature of 285° C. is within $1.0 \times 10^8 \Omega \cdot cm$, and at least one surface of the film has a surface resistivity of 13 log $\Omega$ or lower under a relative humidity of 65%.
2. The biaxially-oriented polyester film for use as a wrap-around container label according to 1, wherein a number of foreign materials having a size of 1 mm or larger per 1 $m^2$ of the film is less than 1.0.
3. The biaxially-oriented polyester film for use as a wrap-around container label according to 1 or 2, wherein the film contains at least an alkaline earth metal compound in 20 ppm or more based on the alkaline earth metal atom and a phosphorus compound in 9 ppm or more based on the phosphorus atom.
4. A biaxially-oriented polyester film for use as a wrap-around container label, wherein the film is a biaxially-oriented polyethylene terephthalate film, a content of ethylene terephthalate cyclic trimer is 9000 ppm or less, a number of foreign materials having a size of 1 mm or larger per 1 $m^2$ of the film is less than 1.0, and at least one surface of the film has a surface resistivity of 13 log $\Omega$ or lower under a relative humidity of 65%.
5. The biaxially-oriented polyester film for use as a wrap-around container label according to any one of 1 to 4, wherein an anionic antistatic agent having an alkyl group of 10 to 20 carbon atoms is present on at least one surface of the film.
6. The biaxially-oriented polyester film for use as a wrap-around container label according to any one of 1 to 5, wherein the anionic antistatic agent is applied before a final heat treatment in a film production step.
7. The biaxially-oriented polyester film for use as a wrap-around container label according to any one of 1 to 6, wherein a shrinkage of the film in the conditions of hot air of 150° C. and treatment time of 30 minutes is within 3% in both longitudinal and width directions.
8. The biaxially-oriented polyester film for use as a wrap-around container label according to any one of 1 to 7, wherein the content of the ethylene terephthalate cyclic trimer is 6000 ppm or less, and a content of the polyethylene terephthalate containing 6000 ppm or less of the ethylene terephthalate cyclic trimer is 10 weight % or more.
9. The biaxially-oriented polyester film for use as a wrap-around container label according to 8, wherein the polyethylene terephthalate containing 6000 ppm or less of the ethylene terephthalate cyclic trimer is made from recycled PET bottles.
10. The biaxially-oriented polyester film for use as a wrap-around container label according to 8 or 9, wherein the polyethylene terephthalate containing of 6000 ppm or less of the ethylene terephthalate cyclic trimer has a coefficient of back pressure increase of a filter of 10 or lower.
11. The biaxially-oriented polyester film for use as a wrap-around container label according to any one of 1 to 10, wherein the Co-b value of the film is 10 or lower.
12. A wrap-around container label is produced from the biaxially-oriented polyester film according to any one of 1 to 11.

Effects of the Invention

The first invention of the present invention can provide a film for use as a wrap-around container label, which comprises a polyester having low oligomer content and causes no loss of productivity and quality of the film. The second invention of the present invention can provide a film for use as a wrap-around container label for beverage, which comprises a polyester with low oligomer content, causes no loss of quality of the film, and is not likely to cause problems due to static electricity.

DESCRIPTION OF THE EMBODIMENTS

Hereinafter, the present invention will be described in detail.

First, the film of the invention may have a monolayer structure of at least one layer or a layered structure of two or more layers. It may be of two-layers, three-layers, four-layers, or five-layers. In the case of two-layers, it may be layered part/base part; in the case of three-layers, it may be layered part (A)/base part/layered part (B) and in the case of three-layers, the layered part (A) and the layered part (B) may have the same composition/constitution or different composition, e.g., a constitution of particle-free layer/base part/particle-containing layer. Further, substantially, these parts may have same thickness or different thickness. Preferably, it is desired to design the layered part (A) and the layered part (B) to have the same composition since the production is easy.

Next, in the film of the invention, at least one layer of the above-mentioned respective constituent layers is preferably oriented biaxially. It is particularly preferable that all layers of the layered structure of two or more layers are oriented biaxially. In the case of a film in which all layers are not oriented- or uniaxially-oriented, the film is not so suitable for use as a wrap-around label and is not much preferable.

A polyester constituting the film of the invention is not particularly limited, and those which contain polyethylene terephthalate as a main component are preferable. In addition, in a range where the effect of the invention is not inhibited, other polymers, e.g., polyethylene-2,6-naphthalate, and the like may be mixed and the polyester may be a copolymerization polyester. Examples of the copolymerization components include polycarboxylic acid components such as adipic acid, sebacic acid, phthalic acid, isophthalic acid, sodium 5-sulfoisophthalate, and trimellitic acid; and polyhydric alcohol components such as diethylene glycol, tetramethylene glycol, hexamethylene glycol, propylene glycol, neopentyl glycol, polyoxyalkyl glycol, p-xylene glycol, and 1,4-cyclohexyl dimethanol. Further, there is no problem even if a heat stabilizer, a modifier, an antioxidant, and the like are contained.

Furthermore, in order to improve the slipping property of the biaxially-oriented polyester film, it may add or apply inorganic lubricants such as titanium dioxide, fine granular silica, kaolin, and calcium carbonate and organic lubricants such as long chain fatty acid esters. Moreover, based on the necessity, additives such as a coloring agent, an antistatic agent, and an ultraviolet absorbent may be added or applied.

A polyethylene terephthalate raw material with low oligomer content is preferable to be used for at least one layer of the film of the invention and regarding the oligomer content in the polyethylene terephthalate film, the content of cyclic trimer of ethylene terephthalate is preferably 9000 ppm or less. The oligomers in the polyethylene terephthalate film include bis-2-hydroxymethylethyl terephthalate (MHET), bis-2-hydroxyethyl terephthalate (BHET) and di- to deca-mers of ethylene terephthalate in addition to unreacted terephthalic acid, and it is preferable to measure the content of a trimer of ethylene terephthalate, which is generally contained in the highest content, for precise measurement. If the content of the ethylene terephthalate cyclic trimer is 9000 ppm or less, stains are hardly generated at the time of film formation of polyethylene terephthalate film and stains are hardly generated particularly on the casting rolls and therefore; it is effective to reduce a risk of foreign material contamination during the film formation of the film product. The content of ethylene terephthalate cyclic trimer is more preferably 9000 ppm or less, furthermore preferably 8000 ppm or less, particularly preferably 7500 ppm or less, and most preferably 6500 ppm or less. However, since it results in an increase of the cost to obtain a polyethylene terephthalate film with extremely high purity, the content may be 4000 ppm or more and further 5000 ppm or more.

In the case of three or more layer constitution, the polyester in the base part may be a polyester which contains substantially no particles or may contain particles. The species of the particle is not particularly limited and examples thereof include, as inorganic particles, fine particles insoluble in a polyester such as calcium carbonate, silica, kaolin, alumina, barium sulfate, and titanium oxide, organic particles such as crosslinked polystyrene and internal particles containing calcium or lithium.

In order that the content of the ethylene terephthalate cyclic trimer in the polyethylene terephthalate film is 9000 ppm or less, it is preferred to carry out film formation by using a polyethylene terephthalate raw material containing the ethylene terephthalate cyclic trimer at a low content. A polyethylene terephthalate raw material having the ethylene terephthalate cyclic trimer content of 6000 ppm or less is particularly preferably used. The content of the ethylene terephthalate cyclic trimer is furthermore preferably 5500 ppm or less and particularly preferably 5000 ppm or less. However, it may cost much to produce the polyethylene terephthalate with low oligomer content in some cases, and therefore, the content of ethylene terephthalate cyclic trimer may be 3000 ppm or more and even 4000 ppm or more.

In order to rationally obtain the above-mentioned polyethylene terephthalate raw material having the ethylene terephthalate cyclic trimer at a low content, it is rational to decrease the oligomer content including the cyclic trimer by carrying out solid-phase polymerization of a common polyethylene terephthalate-polymerized resin and thus increasing the polymerization degree. As a material subjected to such a treatment, there is a PET bottle-recycled raw material and it is preferably usable. In relation to sanitary preservation of beverages as contents, those obtained by solid-phase polymerization with low oligomer content are often used as a polyethylene terephthalate resin for PET bottles, and pellets reproduced from recovered used PET bottles succeed the properties.

Herein, a recycled raw material of PET bottles to be used preferably for the film may be a recycled product of a container including mainly polyethylene terephthalate and for example, recycled products of containers for beverages such as tea beverages and soft drinks are preferably usable and they may be properly oriented and those which are colorless are preferable; however, they may contain a slight amount of a coloring component.

The recycled raw material of PET bottles to be used preferably may be polyesters produced and molded by a common polymerization method and solid-phase polymerization method, and preferably those including mainly polyethylene terephthalate, and which may further contain other polyester components and copolymerization components. The reproduced raw material may contain, as a catalyst, metal compounds of antimony, germanium, and titanium and, as a stabilizer, a phosphorus compound and its intrinsic viscosity is preferably 0.55 or higher and more preferably in a range of 0.60 to 0.80. In general, germanium is often used as a catalyst for a polyester for PET bottles and if a film is produced by using a PET bottle recycled raw material, the film accordingly contains 1 ppm or more of germanium. However, it is no more than the content of a catalyst and it is at highest 100 ppm or less and generally 50 ppm or less.

Non-polyester foreign materials such as remaining beverages, metal components, and ink components used for labels are removed from the collected, used and recycled PET bottles, the recycled PET bottles are washed with water and pulverized to obtain the raw material of the invention. A treatment method for pulverizing or the like is not particularly limited; however, commonly known methods are employed and those obtained by pulverizing into, preferably, about 1 to 10 mm square are preferred.

The amount of the polyethylene terephthalate raw material having the ethylene terephthalate cyclic trimer content of 6000 ppm or less is preferable to be 10 wt % or more in the film. If the amount is less than 10 wt % or lower, the effect of decreasing the content of the ethylene terephthalate trimer in the film is insufficient, and further, in the case where the polyethylene terephthalate raw material having the ethylene terephthalate cyclic trimer content of 6000 ppm or less is a PET bottle reproduced raw material, the effect on social contribution by reducing the environmental load becomes poor and therefore, the amount used is preferably 15 wt % or more, more preferably 25 wt % or more, particularly preferably more than 50 wt %, and most preferably 55 wt % or more. However, if the used amount of the polyethylene terephthalate raw material having the ethylene terephthalate cyclic trimer content of 6000 ppm or less is too high, it becomes difficult to adjust the intrinsic viscosity and hard to control the mechanical properties of the film and therefore, it may be 90 wt % or less.

In the invention, a molten specific resistance of the biaxially-oriented polyester film is preferably $1.0 \times 10^8 \Omega \cdot cm$ or less, and a polyester-based resin to be used for this purpose is preferable to be adjusted to have the molten specific resistance of $1.0 \times 10^8 \Omega \cdot cm$ or less at 285° C. by a measurement method described below. In the case where a molten resin using only a polyester-based resin having a molten specific resistance of more than $1.0 \times 10^8 \Omega \cdot cm$ at 285° C. is contacted to a cooling drum in the above-mentioned production condition of avoiding abnormal electric discharge, cooling is carried out in the state where air is locally incorporated between the molten resin sheet and the cooling drum and therefore, pinner bubbles are generated in the sheet surface and it is not preferable. Further, since it is necessary to lower the production speed for suppressing the pinner bubble generation to an extent that the discharged molten resin can sufficiently contact to the cooling drum, the production cost is increased.

In order to control the molten specific resistance within the above-mentioned range for the polyester-based resin to be used in the invention, an alkaline earth metal compound and a phosphorus compound may be added to the resin. As a method for adding them, a method of mixing a polyester-based resin containing an alkaline earth metal compound and a phosphorus compound with PET reproduced from PET bottles may be employed. An alkaline earth metal atom (M2) in the alkaline earth metal compound has an effect of lowering the molten specific resistance of a resin. An alkaline earth metal compound is used, in general, as a catalyst in the case of generating esters from polycarboxylic acids and polyhydric alcohols, and positive addition of the compound in an amount beyond the necessity as a catalyst makes it possible to exhibit the effect of lowering the molten specific resistance. Specifically, it is recommended to adjust the content of the alkaline earth metal compound to 20 ppm or more, preferably 22 ppm or more, and more preferably 24 ppm or more based on M2 (by mass, the same shall apply hereinafter). On the other hand, it is recommended to adjust the content of the alkaline earth metal compound to 400 ppm or less, preferably 350 ppm or less, and more preferably 300 ppm or less based on M2, because use of the compound beyond the above mentioned content cannot cause any positive effect corresponding to the amount and rather, it may result in adverse effects such as foreign material generation and coloration attributed to the compounds.

Specific examples of a preferable alkaline earth metal compound include alkaline earth metal hydroxides, aliphatic dicarboxylic acid salts (acetic acid salts and butyric acid salts, preferably acetic acid salts), aromatic dicarboxylic acid salts, and salts of compounds having phenolic hydroxyl groups (salts of phenol). Further, examples of the alkaline earth metal include magnesium, calcium, strontium, and barium (preferably magnesium). More specific examples thereof include magnesium hydroxide, magnesium acetate, calcium acetate, strontium acetate, and barium acetate and especially, magnesium acetate is preferably used. The above-mentioned alkaline earth metal compounds may be used alone or two or more kinds may be used in combination. Recently, there is a definition of alkaline earth metals which excludes magnesium; however, in the invention, the conventional definition of alkaline earth metals which includes magnesium is employed. In other words, elements of Group IIa of a periodic table are employed.

The phosphorus compound by itself has no effect of lowering the molten specific resistance of a film; however, in combination with an alkaline earth metal compound and with an alkali metal compound described later, the phosphorus compound can contribute to decrease of the molten specific resistance. The reason for that is not clear; however, it is supposed that addition of the phosphorus compound can suppress generation of foreign materials and increase the amount of a charge carrier. It is recommended to adjust the content of the phosphorus compound to 10 ppm or more, preferably 11 ppm or more, and more preferably 12 ppm or more based on phosphorus atom (P) (by mass, the same shall apply hereinafter). If the content of the phosphorus compound is below the above-mentioned range, the effect of lowering the molten specific resistance is insufficient and the amount of the foreign materials generated tends to be increased.

On the other hand, it is recommended to adjust the content of the phosphorus compound to 600 ppm or less, preferably 550 ppm or less, and more preferably 500 ppm or less based on P, because use of the compound beyond the above mentioned content cannot cause any positive effect corresponding to the amount and the effect of lowering the molten specific resistance is saturated. Furthermore, it promotes generation of diethylene glycol and deteriorates the physical properties of the film.

Examples of the phosphorus compound include phosphoric acids (phosphoric acid, phosphorous acid, hypophosphorous acid, etc.) and their esters (alkyl esters, aryl esters, etc.); and also alkyl phosphonic acid, aryl phosphonic acid and their esters (alkyl esters, aryl esters, etc.). Examples of a preferable phosphorus compound include phosphoric acid; aliphatic esters of phosphoric acid (phosphoric acid alkyl esters, etc.; e.g., phosphoric acid mono C1-6 alkyl esters such as phosphoric acid monomethyl ester, phosphoric acid monoethyl ester, and phosphoric acid monobutyl ester; phosphoric acid di C1-6 alkyl esters such as phosphoric acid dimethyl ester, phosphoric acid diethyl ester, and phosphoric acid dibutyl ester; phosphoric acid tri C1-6 alkyl esters such as phosphoric acid trimethyl ester, phosphoric acid triethyl ester, and phosphoric acid tributyl ester, etc.); aromatic esters of phosphoric acid (phosphoric acid mono-, di-, or tri-C6-9 aryl esters such as triphenyl phosphate and tricresyl phosphate, etc.); aliphatic Esters of phosphorous acid (alkyl esters of phosphorous acid; e.g., mono-, di-, or tri-C1-6 alkyl esters of phosphorous acid such as trimethyl phosphite and tributyl phosphite, etc.); alkyl phosphonates (C1-6 alkyl phosphonates such as methyl phosphonate and ethyl phosphonate, etc.); alkyl phosphonic acid alkyl esters (mono- or di-C1-6 alkyl esters of C1-6 alkyl phosphonic acid, such as dimethyl ethylphosphonate and dimethyl ethylphosphonate, etc.); arylphosphonic acid alkyl esters (mono- or di-C1-6 alkyl esters of C6-9 arylphosphonic acid, such as dimethyl phenylphosphonate and diethyl phenylphosphonate, etc.); and arylphosphonic acid aryl esters (mono- or di-C6-9 aryl esters of C6-9 arylphosphonic acid, such as diphenyl phenylphosphonate, etc.). Examples of a particularly preferable phosphorus compound include phosphoric acid and trialkyl phosphate (trimethyl phosphate). These phosphorus compounds may be used alone or two or more kinds may be used in combination.

Further, it is preferable to add the alkaline earth metal compound and the phosphorus compound at a mass ratio (M2/P) of the alkaline earth metal atom (M2) and the phosphorus atom (P) of 1.2 or more and 5.0 or less to the film. If the M2/P value is 1.2 or lower, the effect of decreasing the molten specific resistance is considerably lowered. It is more preferably 1.3 or more and furthermore preferably 1.4 or more. On the other hand, if the M2/P value exceeds 5.0, an adverse effect of promoting foreign material generation or coloring the film becomes more significant rather than the effect of decreasing the molten specific resistance and therefore, it is not preferable. It is more preferably 4.5 or less and furthermore preferably 4.0 or less.

After such a polyester-based resin is molten in an extruder and filtered by a filter for removing foreign materials, the molten resin is extruded out of a cap into a sheet-like form, contacted to a cooling drum by an electrostatic adhesion method, and cooled and solidified to obtain an undrawn polyester-based resin sheet. Thereafter, based on the necessity, the sheet is drawn in the longitudinal direction or in the width direction. At the time of drawing in the width direction, since the transverse drawing is carried out while both end parts in the width direction of the polyester-based resin sheet are held by clips, the undrawn polyester-based resin sheet is required to have sufficient thickness to hold both end parts with clips. Further, in the case where there is a thin portion in portion of the end parts, the stress is concentrated on the portion at the time of drawing and breakage may possibly be caused at the time of transverse drawing, and therefore, it is required for the undrawn polyester-based resin sheet to have sufficient thickness distribution in the width direction so as to prevent tearing from being generated. A method of adjusting the transverse thickness distribution may be a method of adjusting the interval of the lips of the cap. During the time until when the molten resin sheet is extruded out of the cap, contacted to the cooling drum by an electrostatic adhesion method, and cooled and solidified to obtain the undrawn polyester-based resin sheet, it is required to carry out the adjustment in consideration of generation of shrinkage in the width of the polyester-based resin sheet and increase of the thickness in both end parts. It is preferable for the distribution of the transverse thickness of the end parts of the polyester-based undrawn resin sheet to make the thickness of portions which are not drawn (left while not being drawn) at the time of transverse drawing more thicker toward the end part direction of the sheet.

The electrostatic adhesion method to be employed in the invention is preferably a method for providing electrostatic charge by a wire-like electrode or a band-like electrode. A needle-like electrode is not preferred since the directivity of generated electric power from the electrode surface to the molten polyester-based resin becomes so intense as to easily generate abnormal electric discharge and it results in difficulty of control of the production conditions for preventing consequent sheet breakage and damages of the cooling drum from being generated.

The diameter $\phi$ of the wire-like electrode to be used in the invention is preferably 0.05 to 1.0 mm and particularly preferably 0.08 to 0.5 mm. If the diameter $\phi$ of the wire-like electrode is smaller than 0.05 mm, the wire-like electrode cannot stand the tensile force applied to the wire-like electrode for preventing the electrode deflection due to resonance or mechanical vibration and the wire may be cut and therefore, it is not preferable. Further, if the diameter $\phi$ is larger than 1.0 mm, excess voltage and electric current are required to efficiently and evenly apply electric charges to the molten resin sheet and abnormal electric discharge tends to be generated extremely easily and therefore, it is not preferable.

The wire-like electrode to be used in the invention is preferably one which is rolled up on a reel or the like to successively supply a new electrode at a prescribed speed. In the case of a fixed type electrode, since sublimated materials of monomers, linear oligomers, and cyclic oligomers derived from the molten resin may possibly be deposited on the electrode, and in order to obtain an undrawn polyester-based resin sheet with high quality, the static electric charge to be applied has to be increased with the lapse of time and the probability of abnormal electric discharge is increased and therefore, it is not preferable.

The speed of feeding the rolled wire-like electrode from the reel is preferably 0.1 to 10 m/hour. If the speed of feeding the wire-like electrode is less than 0.1/hour, prevention of the deposition of the sublimated materials such as monomers, linear oligomers, and cyclic oligomers derived from the molten resin may possibly be insufficient and it becomes difficult to give electrostatic charges to the molten resin sheet and only a film with inferior quality including surface defects such as pinner bubbles may be provided and therefore, it is not preferable. If the speed of feeding the wire-like electrode is more than 10 m/hour, the frequency of replacement of the reel with a new reel is increased and the productivity is lowered therefore it is not preferable. Further, if the wire is rolled up on a reel so big as to lessen the replacement frequency, it cannot be set in presently used facilities and large scale reform of the facilities becomes necessary and therefore, it is not preferable. Examples of the electrode transfer apparatus include winding apparatuses manufactured by Nishida Kogyo Co., Ltd.

Examples of the material of the wire-like electrode to be used in the invention include tungsten, iron, nickel, cobalt, molybdenum, titanium, tantalum, aluminum, copper, and stainless steel and their alloys may also be usable. Further, aiming to improve corrosion resistance and oxidation resistance, the surface of the wire-like electrode to be used may be plated with gold, platinum, or the like.

Tensile force is applied to the wire-like electrode to be used in the invention, aiming to prevent the electrode deflection due to resonance, mechanical vibration, air current with which the resin is accompanied, and Coulomb force. The tensile force to be applied to the wire-like electrode is adjusted within the range of guaranteed tensile force of the material of the electrode and within a range in which the electrode deflection is not caused. Specifically, application of a tensile force of 14.7 to 24.5 N to the wire-like electrode makes it possible to produce a polyester-based resin sheet in the state where the wire-like electrode is not disconnected and no electrode deflection is caused. Examples of an apparatus for applying constant tensile force to the wire-like electrode include PERMA-TORK (HC-4-4-J) manufactured by Koshin Seikosho Co., Ltd.

It is preferable to install electric discharge prevention members for suppressing abnormal electric discharge in both end parts of the wire-like electrode to be used in the invention. It is because abnormal electric discharge occurs selectively on the thicker end parts of the sheet closest to the wire-like electrode and on exposed portion of the cooling drum member which is not covered with the extruded polyester-based resin in the case where the molten polyester-based resin is extruded out of the cap on the cooling drum and static electricity is applied by the wire-like electrode. Accordingly, installation of the electric discharge prevention members in the above mentioned positions makes it possible to lower the probability of generation of abnormal electric discharge.

It is preferable to set the positions of the electric discharge prevention members for suppressing the abnormal electric discharge at the time of producing the polyester-based resin sheet in such a manner that the end parts of the electric discharge prevention members are in the inside of 5 to 30 mm from the end parts of the polyester-based resin sheet.

A material for the electric discharge prevention members to be used in the invention is preferably a silicon-based resin or a fluorine-based resin in terms of processibility, heat resistance, and insulation property.

Examples of the silicon-based resin to be used in the invention include vinyl methyl silicones, phenyl vinyl silicones, and fluorosilicones.

Examples the fluorine-based resin to be used in the invention include tetrafluoroethylene polymer (Teflon (registered trade name)), tetrafluoroethylene-perfluoroalkyl vinyl ether copolymer (PFA), tetrafluoroethylene-hexafluoropropylene copolymer (FEP), tetrafluoroethylene-ethylene copolymer.

Further, the electric discharge prevention members to be used in the invention are attached to the end parts of the wire-like electrodes and preferably movable so as to adjust the interval corresponding to the width of the resin sheet in the case where the molten polyester-based resin is extruded out of the cap on the cooling drum and static electricity is applied by the wire-like electrode.

As a method for producing a polyester-based resin sheet free from surface defects such as pinner bubbles and having high quality while increasing the rotation speed of the cooling drum in order to improve the productivity of the polyester-based resin sheet, there are broadly two methods: one is a method of increasing the electric current level to be applied to the wire-like electrode under constant voltage or increasing the voltage level to be applied to the wire-like electrode under constant electric current, and the other is a method of gradually moving the wire-like electrode closer to the polyester-based resin sheet to an extent that the electrode has no contact with the sheet while the electric current and voltage to be applied to the wire-like electrode are made constant, and it is preferable to carry out these methods in combination. That is, in the case where pinner bubbles and the like are generated even if the wire-like electrode is moved closer to the polyester-based resin sheet to an extent that the electrode has no contact with the sheet while the electric current and voltage to be applied to the wire-like electrode are made constant, the electric current level to be applied to the wire-like electrode is increased under constant voltage or the voltage level to be applied to the wire-like electrode is increased under constant electric current, thereby to eliminate the surface defects such as pinner bubbles.

In a method for producing the polyester-based resin sheet of the invention, after a gas is blown to the end parts of the polyester-based resin sheet and electrostatic adhesion of the sheet by the wire-like electrode is carried out, static electricity is provided to the end parts of the polyester-based resin sheet by a needle-like electrode. This is for the purpose of supplementing the insufficient contact between the end parts of the polyester-based resin sheet, which are blocked out by the electric discharge prevention members, and the cooling drum. If static electricity is not provided by the needle-like electrode, due to the insufficient contact between the end parts of the polyester-based resin sheet and the cooling drum, the sheet end parts are crystallized and it results in generation of breakage of the film at the time of transverse drawing and failure of holding with clips for the transverse drawing and therefore, it is not preferable.

It is preferable for the biaxially-oriented polyester film of the invention to have less than one foreign material of 1 mm or larger per 1 m$^2$ of the film in terms of quality of the film, and it can be said that such a film is a film with high quality even if a polyester regenerated raw material is used. No foreign material is most preferable. The above-mentioned very small number of foreign materials is deeply related to low increase of back pressure of a filter for a PET bottle-recycled raw material described below.

In the case where the PET bottle-recycled raw material is used, one having a coefficient of back pressure increase of a filter of 10 or lower is particularly preferable. It is more preferably 5 or lower, and particularly preferably 4 or lower. If the coefficient of back pressure increase of a filter exceeds 10, problems are caused due to abnormal increase of the filter pressure of an extruder in the film formation step, the film quality or the like is deteriorated due to degradation of transparence of the film to be obtained, coarse projections due to foreign materials, and contamination of defective foreign materials such as fish eye and therefore, it is not preferable. The coefficient of back pressure increase of a filter is most preferably 0; however, in consideration of the actual film formability, it may be 1 or higher.

Herein, the PET bottle-recycled raw material means a reproduced raw material produced from polyethylene terephthalate containers such as PET bottles and includes a material reproduced raw material and a chemically reproduced raw material, and only one of them may be used or both may be used while being mixed.

In order to suppress the coefficient of back pressure increase of a filter for the PET bottle reproduced raw material by material recycling to 10 or lower, it is effective to strengthen the filter. In the case where a flaky polyester obtained by pulverizing particularly PET bottles is used as a starting raw material, molten by an extruder, and filtered by a filter to prepare pellets, it is preferable to finally collect the contaminated foreign materials by filtration with a filter having a mesh size almost the same as that of a filter to be used in the film formation step. Further, collection by filtration is preferable to be carried out 3 or more times before molding into pellets to be supplied to the film formation step. The mesh size of the filter is more preferable as it is smaller; however if a filter with a too small mesh size is used in a stage in which many impurities are contained, the back pressure becomes high and the step control becomes difficult and therefore, filters having a mesh size made gradually smaller along with the progression of the step are particularly preferable to be used for the successive collection by filtration of 3 or more times. For example, filtration may be carried out 3 or more times by using filters in which the mesh size is gradually changed to smaller size in such a manner that the first time is 200 meshes, the second time is 400 meshes, and the third time is 50 μm. It is natural that if filtration is carried out using a filter with a fine mesh size of, for example, 20 to 60 μm immediately before final pelletization is carried out, a polyester reproduced raw material satisfactory for film specification can be obtained and therefore, it is preferable.

Also in the film formation step, it is preferable to carry out filtration by a filter 2 or more times before melt extrusion and a film with little foreign materials is obtained.

The biaxially-oriented polyester film of the invention has an anionic antistatic agent having an alkyl group with 10 to 20 carbon atoms at least in one surface (preferably both surfaces). This constitution makes it possible to suppress the static electricity generation and accumulation in secondary processing step of the film or the like and prevent various kinds of problems due to the static electricity from being generated. Adjustment of the surface resistivity to 13 log Ω or lower under a relative humidity of 65% RH for at least one surface of the film is an index of the antistatic property and if the surface resistivity exceeds 13 log Ω, the antistatic property becomes insufficient and therefore, it is not preferable. It is more preferably 11 log Ω or lower. In terms of practical application, it may be 2 log Ω or higher. The biaxially-oriented polyester film of the invention is used mainly as a wrap-around container label, and in the post-processing step after wrapping around a container, the static electricity worsens the handling property and induces improper wrapping around a container and accordingly, the antistatic property of the film is important.

The above-mentioned anionic antistatic agent is one having a carbon number of 10 to 20. If an antistatic agent having such a molecular structure is used, at the time of, for example, processing a film (at the time of film production and at the time of secondary processing), even if the film is exposed to heat, the antistatic agent can be suppressed from scattering or removal from the film surface and therefore, the antistatic effect can be more reliably secured.

That is, in the case of an anionic antistatic agent having a carbon number below the above-mentioned range, due to the heat applied at the time of processing the film, the ratio of scattering or removal of the anionic antistatic agent from the film is extremely high and the effect of using the antistatic agent may not be exerted sufficiently in some cases. On the other hand, in the case of an anionic antistatic agent having a carbon number exceeding the above-mentioned range, some of such agents have an insufficient antistatic effect and the effect of using the antistatic agent may not be sufficiently secured in some cases. The carbon number of the anionic antistatic agent is preferably 12 or more and 18 or less.

Examples of the anionic antistatic agent include those having an alkyl group with a carbon number of 10 to 20 among sulfuric acid and sulfonic acid derivatives such as a higher alcohol sulfuric acid ester salt, a sulfuric acid ester salt of alkylphenol ethylene oxide adduct an alkyl sulfonic acid salt, and an alkyl allylsulfonic acid salt. More specific examples thereof include those having an alkyl group with a carbon number of 10 to 20 among an alkylsulfonic acid salt, an alkylbenzenesulfonic acid salt, an alkyl sulfuric acid ester salt, an alkyl ethoxysulfuric acid ester salt, and an alkyl phosphoric acid ester salt. Above all, dodecyl sulfonate and dodecylbenzene sulfonate are preferable.

In the film of the invention, as a method of making the anionic antistatic agent present on the film surface, it is preferable to employ a method (coating method) of applying a coating solution containing the antistatic agent to the film surface.

As an antistatic measure for the film, a method of kneading the antistatic agent to a raw material resin of the film and using the raw material for the film formation (kneading method) may also be used, in addition to the coating method. In the case of the film using the kneading method, the antistatic agent bleeds out to the surface from the film inside to exert the antistatic effect. However, in the case of a polyester-based film, since the glass transition temperature of the polyester is generally high, it may be often difficult for the antistatic agent to bleed out to the film surface at around normal temperature, therefore, the antistatic effect tends to become insufficient. Further, the polyester-based film has relatively high film formation temperature and also the reactivity of the polar group of the polyester is high, so that if the antistatic agent is blended, deterioration of the polyester is promoted at the time of film formation and it may lead to deterioration of the physical properties and coloration in some cases.

Contrarily, in the case of the coating method, since the antistatic agent is made to be present directly on the film surface, the antistatic effect is efficiently caused independently of the high glass transition temperature of the polyester and the film deterioration and coloration due to the introduction of the antistatic agent can be prevented.

The timing of applying the coating solution containing the antistatic agent to the film surface is not particularly limited and the coating solution may be applied to the undrawn film after melt-extrusion and before drawing and may be applied to the film after drawing of the film (after uniaxial drawing or biaxial drawing) (details will be described below).

For the coating solution to be applied to the film, as a solvent, a mixed solvent of a lower alcohol having a carbon number of 1 to 3 and water is preferably used. Examples of the lower alcohol having a carbon number of 1 to 3 include methanol, ethanol, n-propanol, and isopropanol, which can be mixed with water at an arbitrary ratio. An alcohol having high carbon numbers causes phase separation from water when the coating solution is prepared and if such a coating solution is used, a coating unevenness tends to occur and therefore, it is not preferable. However, such an alcohol may be used in combination with the lower alcohol having a carbon number of 1 to 3 to an extent that no phase separation is caused.

The lower alcohol is preferably in an amount of 10% by mass or more in the coating solution. If the amount of the lower alcohol is less than 10% by mass, the surface tension of the coating solution becomes high and the wettability to the film is lowered and thus a coating unevenness tend to occur and also, although the reason is unclear, in the case of a biaxially-oriented film obtained by applying the coating solution and then drying the solution, the transparency of the film may be lowered and the practical usability may be deteriorated in some cases when the temperature and humidity is changed rapidly.

Further, the amount of the lower alcohol in the coating solution is preferably 60% by mass or less. In the case where the amount of the lower alcohol in the coating solution is more than 60% by mass, since the amount of the organic solvent in the coating solution is increased and therefore, there is a risk of explosion and it is necessary to take a countermeasure to prevention of the explosion when the coating solution is applied during the film production step. In addition, an alcohol having high carbon numbers is used in combination with the lower alcohol, it is recommended to adjust the total amount of the alcohols in the coating solution to 60% by mass or less.

The amount of the anionic antistatic agent to be present on the film surface by application of the coating solution is preferably 0.001 to 0.5 $g/m^2$. If the amount of the anionic antistatic agent to be present on the film surface is below the range, the antistatic effect may not be secured sufficiently in some cases. On the other hand, if the amount of the anionic antistatic agent to be present exceeds the range, the transparency and blocking resistance of the film may possibly be lowered in some cases.

The color b value (Co-b value) of the film is preferably 10 or lower. It is more preferably 5 or lower and particularly preferably 3 or lower. If the color-b value (Co-b value) of the film is more than 10, deterioration of the film quality becomes significant in the case where the pellets recovered from the film are used as a film raw material and therefore, it is not preferable. In order to adjust the color-b value (Co-b value) of the film to 10 or lower even in the case of using the PET bottle-recycled raw material, filtration strengthening in the pelletization step of the PET bottle-recycled raw material described below is effective and it is preferable to carry out filtration 3 or more times. It is preferable that the color-b value is low; however, it may be 1.0 or higher in terms of the quality of the pellets recovered from the film.

The thermal shrinkage percentage of the film is preferably within 3% in both directions, the film flow (longitudinal) direction and width direction, after treatment with hot air at 150° C. for 30 minutes. It is more preferably 2% or lower. If the shrinkage percentage of the film is more than 3%, the size stability is so insufficient as to be apt to cause defects such as shrinkage of the film in the processing of printing and therefore, it is not preferable. It is preferable that the shrinkage percentage of the film is close to 0% as much as possible; however, in terms of required properties for actual use, it may be 0.1% or higher.

(Polyester Resin)

For the polyester film of the invention, polyethylene terephthalate, polybutylene terephthalate, polyethylene-2,6-naphthalate, or a copolymer containing, as a main component, constituent components of these resins may be employed, and above all, a biaxially-drawn film made of polyethylene terephthalate is particularly preferable. A method for producing these polymers is not particularly limited and it is preferable to use a polyester having reduced oligomer content by means of solid-phase polymerization, solvent extraction of the polymer or the like.

Further, in the polyester film to be used in the invention, a polycondensation catalyst (an ester exchange reaction catalyst is also used in the case of an ester exchange method), and a heat stabilizer such as phosphoric acid or a phosphorus compound are used as essential components. Other than these compounds, it is preferable to add a proper amount of an alkali metal salt or an alkaline earth metal salt since an undrawn sheet with a uniform thickness can be obtained by contacting and solidifying a sheet-like molten polyester resin onto a rotating cooling roll by a static electricity application method.

Further, in order to improve handling properties of the film such as a slipping property, a winding property, and blocking resistance and wear properties such as wear resistance and scratching resistance, it is preferable to add inactive particles to the polyester film of the base material. Additionally, based on the necessity, various kinds of additives may be added to the polyester resin. Examples of the additives include an antioxidant, a light resistance agent, a gelation prevention agent, an organic lubricant, an antistatic agent, an ultraviolet absorbent, and a surfactant.

In the case where the handling property is required while the transparency of the polyester film of the invention is maintained, fine particles may be added only to the surface layer but substantially no particles may be added in the center layer of the film.

(Production of Biaxially-Oriented Polyester Film)

The method for producing a biaxially-oriented polyester film of the invention will be described with reference to a polyethylene terephthalate (hereinafter, abbreviated as PET) film, but the method is not limited thereto.

After a PET resin and a recycled raw material from PET bottle are sufficiently vacuum: dried, they are supplied to an extruder and a molten PET resin having a temperature of about 280° C. is melt-extruded out of a T die in a sheet-like form to a rotating cooling roll and cooled and solidified by a static electricity application method to obtain an undrawn PET sheet. The undrawn PET sheet may have a monolayer constitution or a multilayer constitution by a co-extrusion method. Further, in the case where high transparency is required, it is preferable that no inactive particles are added in the resin.

The obtained undrawn PET sheet is drawn 2.5 to 5.0 times in the longitudinal direction by rolls heated at 80 to 120° C. to obtain a uniaxially drawn PET film. Further, the edge parts in the width direction of the film are held by clips, the film is led to a hot air zone heated at 70 to 140° C. and drawn 2.5 to 5.0 times in the width direction. Successively, the film is led to a heat treatment zone at 160 to 240° C. and subjected to heat treatment for 1 to 60 seconds to complete crystalline orientation. Addition of an anionic antistatic agent may be carried out in undrawn stage, after the uniaxial drawing, or after the biaxial drawing; however it is effectively preferable that the addition is before final heat setting.

The biaxially-oriented polyester film of the invention is preferably used as a wrap-around label for a container. Herein, the container refers to mainly a PET bottle for beverage in a relatively large size of about 1 to 4 L, and the film may be subjected to printing and then cut into labels if necessary, and wound on a body of the PET bottle for beverage and applied to the body by an adhesive, a solvent, or thermal adhesion. That is, being different from a label which is employed in such an aspect that the label is made to have a tubular or sleeve-like form by previously bonding its both ends, put on a container, and thermally shrunk, the wrap-around container label used in the invention does not require any equipment for heat shrinkage attachment and is thus economical. Further, the label can be provided with a low heat shrinkage property and shows only slight quality change of the heat shrinkage property or the like even under storage in a relatively high temperature condition and is thus easy to handle.

EXAMPLES

Next, the present invention will be described WITH reference to examples and comparative examples; however, as a mater of course, the invention is not at all limited to the following examples. The evaluation methods employed in the invention are as follows.

1. Molten Specific Resistance

A pair of electrode plates was inserted in a sample (a chip or a film) molten at a temperature of 275° C. and voltage of 120 V was applied. The electric current at that time was measured and the molten specific resistance Si (Ω·cm) was calculated according to the following expression:

$$Si=(A/I)\times(V/io)$$

wherein, "A" represents surface area of the electrode ($cm^2$); "I" represents interval between the electrodes (cm); "V" represents voltage (V); and "io" represents electric current (A).

2. Coefficient of Back Pressure Increase of Filter

After dried at 135° C. for 12 hours, polyester pellets were extruded in the conditions of a temperature of 285° C., a filter diameter of 20 μm, a discharge rate of 6 g/minute, and a discharge time of 4 hours, and the pressure change of the filter for every 30 minutes was recorded to calculate the coefficient of back pressure increase of the filter according to the following expression:

$$K=\Delta P/(Q/S)$$

wherein, "K" represents coefficient of back pressure increase of filter; "ΔP"=P1-P0
"P1" represents pressure after 4 hour extrusion (MPa); "P0" represents pressure at starting of extrusion (MPa); "Q" represents extrusion discharge amount (kg/hr); and "S" represents filter surface area ($cm^2$).

3. Analysis of Magnesium

A sample was incinerated and decomposed in a platinum crucible and an obtained sample was subjected to addition of 6 mol/L hydrochloric acid and then was evaporating and drying to be solidified. The resulting sample was dissolved in 1.2 mol/L hydrochloric acid and subjected to quantitative analysis by ICP optical emission spectrometry (ICPS-2000, manufactured by Shimadzu Corporation).

4. Analysis of Phosphorus

A sample was dry-incinerated and decomposed in the co-presence of sodium carbonate or wet-decomposed in a sulfuric acid-nitric acid-perchloric acid system or in a sulfuric acid-hydrogen peroxide water system to convert phosphorus into orthophosphoric acid. Next, reaction with a molybdenic acid salt was carried out in a 1 mol/L sulfuric acid solution to obtain phosphomolybdic acid, which was then reduced by hydrazine sulfate to obtain heteropoly blue and its absorbance of 830 nm was measured by an absorptiometer (UV-150-02, manufactured by Shimadzu Corporation) for colorimetric determination.

5. Chemical Analysis Method for Germanium

A sample in amount of 2 g was incinerated and decomposed in a platinum crucible, mixed with 5 ml of a 10% sodium hydrogen carbonate solution and then evaporated, and further hydrochloric acid was added to an obtained sample and the obtained sample was evaporated and dried. The resulting sample was heated from 400° C. to 950° C. in an electric furnace and left still for 30 minutes to be molten. The resulting sample was warmed and dissolved in 10 ml of water and transferred to a germanium distillation apparatus (washing with water 7.5 ml×2). After 35 ml of hydrochloric acid was added, the sample was distilled to obtain 25 ml of a distilled liquid. A proper amount thereof was sampled and hydrochloric acid was added so as to adjust the final concentration to 1 to 1.5 mol/L. Further, 2.5 ml of a 0.25% polyvinyl alcohol solution, 2.5 ml of a 1% cetyltrimethylammonium chloride solution, and 5 ml of a 0.04% phenylfluorone (2,3, 7-trihydroxy-9-phenyl-6-fluorone) solution were added and the volume was adjusted to 25 ml with water. A yellow complex with Ge was formed and the absorbance of 505 nm was measured by an absorptiometer (UV-150-02, manufactured by Shimadzu Corporation) for colorimetric determination.

6. Foreign Materials in Film

Each obtained film was cut into a 250 mm×250 mm film specimen and the number of foreign materials with a diameter of 1 mm or larger was measured for the entire range of 250 mm×250 mm (0.0625 $m^2$) by observation in the direction perpendicular to the film surface by a microscope equipped with a scale. This operation was carried out for 20 film specimens and the total number of foreign materials was divided by the total observation surface area (1.25 $m^2$) to obtain the number of foreign materials per unit surface area 1 $m^2$ (number/$m^2$) and one place of decimals was rounded off.

7. Surface Resistivity

Surface resistivity was measured using a surface resistivity measurement apparatus (Main body: R8340, Sample box: R12704) manufactured by Advantest Corporation at an application voltage of 100 V in an atmosphere of 23° C. and 65% RH and the read value of the measurement apparatus was defined as the surface resistivity.

8. Intrinsic Viscosity (IV)

Each sample was vacuum dried at 130° C. all day and all night and thereafter pulverized or cut, and 80 mg of the obtained sample was accurately weighed and heat-dissolved at 80° C. for 30 minutes in a mixed solution of phenol/tetrachloroethane=60/40 (volume ratio). After the total volume was adjusted to 20 ml by the same mixed solution and the measurement was carried out at 30° C.

9. Content of Ethylene Terephthalate Cyclic Trimer in Polyethylene Terephthalate About 100 mg of a sample was accurately weighed and dissolved in 3 mL of 1,1,1,3,3-hexafluoro-2-propanol/chloroform=2/3 (v/v). Chloroform in an amount of 20 mL was added and re-precipitation was carried out by 10 mL of methanol. After filtration, the filtrate was concentrated, dried and solidified to obtain a dried and solidified product, which was again dissolved in 10 mL of N,N-dimethylformamide. The obtained solution (measurement sample) was centrifuged and filtered and the filtrate was subjected to high-performance liquid chromatography (HPLC).

HPLC analysis conditions
Apparatus; L-7.000 (manufactured by Hitachi Ltd.)
Column: μ-Bondasphere C18 5μ
100 angstroms
3.9 mm×15 cm (manufactured by Waters)
Eluate A: Aqueous 2% acetic acid solution (v/v %)
Eluate B: Acetonitrile
Gradient B %: 10%→100%, (0→55 minutes);
  100%→100%, (55→56 minutes);
  100%→10%, (56→60 minutes)
Flow rate: 0.8 mL/minute
Detection: UV-258 nm
Column temperature: 30° C.
Injection amount: 10 μL (Method of Analyzing Ethylene Terephthalate Cyclic Trimer)

A DMF solution with a known content, 70 ppm, of ethylene terephthalate cyclic trimer was prepared (standard solution) using a separately produced ethylene terephthalate cyclic trimer and analysis was carried out in the above-mentioned HPLC analysis conditions. The peak area of 70 ppm of the ethylene terephthalate cyclic trimer was measured from the obtained chromatogram, and the concentration of the ethylene terephthalate cyclic trimer contained in each HPLC sample of the standard solution was measured from the peak area and also the peak area of the ethylene terephthalate cyclic trimer of the chromatogram obtained by analysis in the above-mentioned analysis conditions. Using the concentration of the ethylene terephthalate cyclic trimer in each sample of the standard solution, the content of the ethylene terephthalate cyclic trimer contained in the measurement sample was calculated.

10. Heat Shrinkage

After sampling was carried out in 10 mm width and marked lines were put at 200 mm interval and the interval of the marked lines (L0) were measure, the film was sandwiched between paper and placed in an hot air oven controlled at a temperature of 150° C. and treated for 30 minutes and thereafter, the sample was taken out and the interval (L) of the marked lines was measured to calculate the heat shrinkage from the following expression.

Heat shrinkage (%) {(L0-L)/L 0}×100

11. Co-b Value

Color-b value (Co-b value) was measured by using a colorimeter (Z-1001DP, manufactured by Nippon Denshoku Industries Co., Ltd.)

12. Pinner Bubble Evaluation

The films obtained in examples and comparative examples were observed visually by using a polarization plate manufactured by Nishida Kogyo Co., Ltd., and the pinner bubbles generated in the film surface were evaluated according to the following standard. Those marked with ◯ were defined as good.

◯: No pinner bubble generation

Δ: Pinner bubble generation was partially observed x: Pinner bubble generation was significant (Synthesis Example of Polyester)

(Polyester A)

An esterification reaction can was heated and at the time when it reached 200° C., a slurry including terephthalic acid (86.4 parts by mass) and ethylene glycol (64.4 parts by mass) was loaded and under stirring condition, antimony trioxide (0.017 parts by mass) and triethylamine (0.16 parts by mass) were added thereto as catalysts. Next, the temperature was increased by heating and the pressure esterification reaction was carried out in the conditions of a gauge pressure of 0.34 MPa and 240° C.

Thereafter, the esterification reaction can was turned back to normal pressure and magnesium acetate tetrahydrate (0.071 parts by mass) and then trimethyl phosphate (0.014 parts by mass) were added. Furthermore, the temperature was increased to 260° C. over 15 minutes and thereafter, trimethyl phosphate (0.012 parts by mass) and sodium acetate (0.0036 parts by mass) were added. The obtained esterification reaction product was transferred to a polycondensation reaction can and gradually heated from 260° C. to 280° C. under reduced pressure and thereafter polycondensation reaction was carried out at 285° C. On completion of the polycondensation reaction, filtration treatment was carried out with a filter made of a stainless steel sintered body with a pore diameter of 5 (initial filtration efficiency 95%).

Next, in a closed room in which airborne foreign materials with a diameter of 1 μm or larger were decreased by a HEPA filter, polyethylene terephthalate (PET), which is the above-mentioned polycondensation reaction product, was subjected to pelletization to obtain a polyester A.

(Polyester D)

A polyester D was obtained in the same manner as in the polyester A, except that the pressure esterification reaction was carried out by adding antimony trioxide (0.025 parts by mass) as a catalyst, the inside of the esterification reaction can was turned back to normal pressure, and then magnesium acetate tetrahydrate (0.34 parts by mass) and trimethyl phosphate (0.042 parts by mass) were added, and further the temperature was increased to 260° C. over 15 minutes, and thereafter trimethyl phosphate (0.036 parts by mass) was added.

In Table 1, the contents of inorganic components (Mg, P) are concentrations based on the respective atoms (unit: ppm, based on mass). The respective inorganic components were derived as follows.
Mg: mainly derived from magnesium acetate tetrahydrate.
P: mainly derived from trimethyl phosphate.

(Polyester E)

An autoclave made of a stainless steel and equipped with a stirrer, a thermometer, and a partially refluxing type condenser was loaded with 100 mol % of dimethyl terephthalate (DMT) as a dicarboxylic acid component and 100 mol % of ethylene glycol (EG) as a glycol component at a molar ratio of the glycol 2.2 times as much as that of the methyl ester, and 0.05 mol of zinc acetate (to acid component) as a transesterification catalyst and 0.025 mol of antimony trioxide (to acid component) as a polycondensation catalyst were added and transesterification reaction was carried out while the generated methanol was removed outside by distillation. Thereafter, polycondensation reaction was carried out at 280° C. in a reduced pressure condition of 26.7 Pa and filtration was carried out by a normal method to obtain a polyester (E).

(Pet Bottle-Recycled Raw Material)

Polyester (B): Flakes obtained by washing foreign materials such as the remaining beverages or the like out of PET bottles for beverage and then pulverizing the PET bottles were molten in an extruder and filtered twice for collecting fine foreign materials by filtration with filters in which the mesh sizes were successively changed to be finer and finally collected by filtration at the third time with a filter with the smallest mesh size of 50 μm, to obtain a reproduced raw material with a coefficient of back pressure increase of the filter of 3.

Polyester (C): Flakes which are the same as those of the above-mentioned polyester (B) were pelletized and filtered by a filter with a 200 mesh once to obtain a reproduced raw material with a coefficient of back pressure increase of the filter of 13.

(Preparation of Anionic Antistatic Coating Solution)

Coating Solution 1

Dodecyl sulfonate was diluted by adding water and further isopropanol was added to obtain a coating solution with a solid content concentration of 2% by mass (dodecyl sulfonate: 2% by mass, water: 63% by mass, and isopropanol 35% by mass).

Example 1

As raw materials, the polyester (A) and the polyester (B) were mixed at a ratio of 40% by mass for the polyester (A) and 60% by mass for the polyester (B), and the mixture was dried at 135° C. for 6 hours in a reduced pressure of 33 Pa. Thereafter, the mixture was molten, filtered twice by filters having mesh of 100 μm and 50 μm respectively, then supplied to an extruder, melt-extruded in a sheet-like form at about 280° C., and quenched, contacted and solidified onto a rotating cooling metal roll at a rotation speed of 34 m/minute, in which the roll surface temperature was kept at 25° C., by a static electricity application method using a wire electrode to obtain an undrawn PET sheet with a thickness of 292 μm.

The undrawn PET sheet was heated to 100° C. by heated roll groups and an infrared heater and thereafter drawn 4.1 times in the longitudinal direction by roll groups having different circumferential velocity to obtain a uniaxially drawn PET film.

Next, after the coating solution 1 was applied to one surface of the uniaxially drawn PET film by an air knife manner so as to adjust the amount applied after drying to 0.008 g/m$^2$, the film was drawn 4.2 times at 130° C. in the width direction by a tenter and in the state where the length of the film in the width direction was fixed, the film was heated at 229° C. for 2.6 seconds and further 5.5% relaxing treatment in the width direction was carried out at 200° C. for 2.6 seconds to obtain a biaxially-drawn PET film with a thickness of 18 μm. The evaluation results are shown in Table 3.

Example 2

A biaxially-drawn PET film with a thickness of 18 μm was obtained in the same manner as in Example 1, except that the constitution of the film was made to be trilayer of 100% by mass of the polyester (B) as the center layer and 100% by

TABLE 1

| Polyester | Composition (mole %) Polyvalent carboxylic acids TPA | Composition (mole %) Polyhydric alcohols EG | Composition (mole %) Polyhydric alcohols DEG | Intrinsic viscosity (dl/g) | Ethylene terephthalate trimer content (ppm) | Coefficient of back pressure increase of filter | Magnesium content (ppm) | Phosphorus content (ppm) | Molten specific resistance (×10$^8$ Ω·cm) |
|---|---|---|---|---|---|---|---|---|---|
| A | 100 | 100 | 0 | 0.60 | 10500 | 2 | 84 | 45 | 0.21 |
| B | 100 | 97.5 | 2.5 | 0.70 | 4970 | 3 | 0 | 0 | 12.50 |
| C | 100 | 97.5 | 2.5 | 0.70 | 5030 | 13 | 0 | 0 | 12.60 |
| D | 100 | 100 | 0 | 0.60 | 10500 | 2 | 400 | 140 | 0.04 |
| E | 100 | 100 | 0 | 0.60 | 10500 | 2 | Not measured | Not measured | Not measured |

Loading compositions are shown for polyesters A, D, and E
Compositions obtained by analyzing pellets with H-NMR are shown for polyesters B and C mass of the polyester (A) as the surface layers at a thickness ratio of surface layer/center layer/surface layer=20/60/20. The evaluation results are shown in Table 3.

Example 3

A biaxially-drawn PET film with a thickness of 18 μm was obtained in the same manner as in Example 1, except that 80 wt % of the polyester (B) and 20 wt % of the polyester (D) were used as raw materials and the mixture was quenched, contacted, and solidified at a rotating speed of 60 m/minute. The evaluation results are shown in Table 3.

Comparative Example 1

A biaxially-drawn PET film with a thickness of 18 μm was obtained in the same manner as in Example 1, except that 100% by mass of the polyester (B) was used as a raw material and filtration was changed to one time filtration with a filter having a mesh of 100 μm and the coating solution 1 was not applied. The evaluation results are shown in Table 3.

Comparative Example 2

A biaxially-drawn PET film with a thickness of 18 μm was obtained in the same manner as in Example 1, except that 40% by mass of the polyester (A) and 60% by mass of the polyester (C) were used as raw materials and filtration was changed to one time filtration with a filter having a mesh of 100 μm and the coating solution 1 was not applied. The evaluation results are shown in Table 3.

TABLE 2

| | | | Example 2 | | | | Comparative | Comparative |
|---|---|---|---|---|---|---|---|---|
| Layer constitution | | Example 1 Monolayer | Surface layer 1 | Center layer | Surface layer 2 | Example 3 Monolayer | Example 1 Monolayer | Example 2 Monolayer |
| Polyester mixing ratio (mass %) | Polyester A | 40 | 100 | — | 100 | — | — | 40 |
| | Polyester B | 60 | — | 100 | — | 80 | 100 | — |
| | Polyester C | — | — | — | — | — | — | 60 |
| | Polyester D | — | — | — | — | 20 | — | — |
| Layer constitutional ratio (weight %) | | 100 | 20 | 60 | 20 | 100 | 100 | 100 |
| Rotating cooling drum speed (m/min) | | 34 | 34 | | | 60 | 34 | 34 |
| Longitudinal drawing | Drawing temperature (° C.) | 100 | 100 | | | 100 | 100 | 100 |
| | Drawing ratio | 4.1 | 4.1 | | | 4.1 | 4.1 | 4.1 |
| Lateral drawing | Drawing temperature (° C.) | 130 | 130 | | | 130 | 130 | 130 |
| | Heat set temperature (° C.) | 229 | 229 | | | 229 | 229 | 229 |
| | Drawing ratio | 4.2 | 4.2 | | | 4.2 | 4.2 | 4.2 |
| | Relaxation ratio (%) | 5.5 | 5.5 | | | 5.5 | 5.5 | 5.5 |

TABLE 3

| | Example 1 | Example 2 | Example 3 | Comparative Example 1 | Comparative Example 2 |
|---|---|---|---|---|---|
| Ethylene terephthalate trimer content (ppm) | 7030 | 7050 | 6080 | 4970 | 7040 |
| Pinner bubble | ○ | ○ | ○ | x | ○ |
| Germanium content (ppm) | 11 | 11 | 15 | 18 | 11 |
| Magnesium content (ppm) | 33.6 | 33.6 | 80 | 0 | 33.6 |
| Phosphorus content (ppm) | 18 | 18 | 28 | 0 | 18 |
| Molten specific resistance (×10$^8$ Ω·cm) | 0.83 | 0.83 | 0.23 | 12.5 | 0.85 |
| Color phase: Co-b | 1.1 | 1.2 | 1.0 | 0.9 | 1.2 |
| Foreign materials in film (number/m$^2$) | 0 | 0 | 0 | 0 | 10 |
| Surface resistivity (log Ω) | 9.5 | 9.5 | 9.5 | 16 or more | 16 or more |
| Film intrinsic viscosity (dl/g) | 0.62 | 0.62 | 0.62 | 0.65 | 0.61 |
| Heat shrinkage % Longitudinal | 0.2 | 0.2 | 0.2 | 0.2 | 0.2 |
| Lateral | 1.3 | 1.2 | 1.3 | 1.2 | 1.3 |

Example 4

As raw materials, the polyester (E) and the polyester (B) were mixed at a ratio of 40% by mass for the polyester (E) and 60% by mass for the polyester (B), and the mixture was dried at 135° C. for 6 hours in a reduced pressure of 33 Pa. Thereafter, the mixture was molten, filtered twice by filters having a mesh of 100 μM and 50 μm respectively, then supplied to an extruder, melt-extruded in a sheet-like form at about 280° C., and quenched, contacted and solidified onto a rotating cooling metal roll at a rotation speed of 34 m/minute, in which the surface temperature was kept at 25° C., by a static electricity application method using a wire electrode to obtain an undrawn PET sheet with a thickness of 292 μm.

The undrawn PET sheet was heated to 100° C. by heated roll groups and an infrared heater and thereafter drawn 4.1 times in the longitudinal direction by roll groups having different circumferential velocity to obtain a uniaxially drawn PET film.

Next, after the coating solution 1 was applied to one surface of the uniaxially drawn PET film by an air knife manner so as to adjust the amount applied after drying to 0.008 g/m², the film was drawn 4.2 times at 130° C. in the width direction by a tenter and in the state where the length of the film in the width direction was fixed, the film was heated at 229° C. for 2.6 seconds and further 5.5% relaxing treatment in the width direction was carried out at 200° C. for 2.6 seconds to obtain a biaxially-drawn PET film with a thickness of 18 μm. The evaluation results are shown in Table 3.

Example 5

A biaxially-drawn PET film with a thickness of 18 μm was obtained in the same manner as in Example 4, except that the constitution of the film was made to be trilayer of 100% by mass of the polyester (B) as the center layer and 100% by mass of the polyester (E) as the surface layers at a thickness ratio of surface layer/center layer/surface layer=20/60/20. The evaluation results are shown in Table 3.

Comparative Example 3

A biaxially-drawn PET film with a thickness of 18 μm was obtained in the same manner as in Example 4, except that 40% by mass of the polyester (E) and 60% by mass of the polyester (C) were used as raw materials and filtration was changed to one time filtration with a filter having a mesh of 100 μm and the coating solution 1 was not applied. The evaluation results are shown in Table 3.

TABLE 4

| Layer constitution | | Example 4 Monolayer | Example 5 Surface layer 1 | Example 5 Center layer | Example 5 Surface layer 2 | Comparative Example 3 Monolayer |
|---|---|---|---|---|---|---|
| Polyester mixing ratio (mass %) | Polyester E | 40 | 100 | — | 100 | 40 |
| | Polyester B | 60 | — | 100 | — | — |
| | Polyester C | — | — | — | — | 60 |
| Layer constitutional ratio (weight %) | | 100 | 20 | 60 | 20 | 100 |
| Longitudinal drawing | Drawing temperature (° C.) | 100 | | 100 | | 100 |
| | Drawing ratio | 4.1 | | 4.1 | | 4.1 |
| Lateral drawing | Drawing temperature (° C.) | 130 | | 130 | | 130 |
| | Heat set temperature (° C.) | 229 | | 229 | | 229 |
| | Drawing ratio | 4.2 | | 4.2 | | 4.2 |
| | Relaxation ratio (%) | 5.5 | | 5.5 | | 5.5 |

TABLE 5

| | Example 4 | Example 5 | Comparative Example 3 |
|---|---|---|---|
| Ethylene terephthalate trimer content (ppm) | 7030 | 7050 | 7040 |
| Germanium content (ppm) | 11 | 11 | 11 |
| Color phase: Co-b | 1.1 | 1.2 | 1.2 |
| Foreign materials in film (number/m²) | 0 | 0 | 9.6 |
| Surface resistivity (log Ω) | 9.5 | 9.5 | 16 or more |
| Film intrinsic viscosity of film (dl/g) | 0.62 | 0.62 | 0.61 |
| Heat shrinkage (%) Longitudinal | 0.2 | 0.2 | 0.2 |
| Heat shrinkage (%) Lateral | 1.3 | 1.2 | 1.3 |

INDUSTRIAL ALLICABILITY

According to the present invention, a film for use as a wrap-around container label, which includes a raw material reproduced from PET bottles for beverage, causes no loss of productivity and quality of the film, and is not prone to problems due to static electricity, can be obtained. Further, film scraps, which are not produced into a product at the time of the production, may be recovered and reused as film raw materials and therefore, the invention is advantageous in terms of economy and environmental load.

The invention claimed is:

1. A biaxially-oriented polyester film for use as a wrap-around container label, wherein
   the film comprises polyethylene terephthalate,
   the film has a content of polyethylene terephthalate made from recycled PET bottles of 55 wt % or more and 90 wt % or less,
   the film has a content of polyethylene terephthalate containing 6000 ppm or less of ethylene terephthalate cyclic trimer of 10 wt % or more,
   the polyethylene terephthalate containing 6000 ppm or less of ethylene terephthalate cyclic trimer is made from recycled PET bottles, the film has a content of ethylene terephthalate cyclic trimer of 6000 ppm or less, the film has a molten specific resistance of $1.0 \times 10^8$ Ω·cm or less at a temperature of 285° C., at least one surface of the film has a surface resistivity of 13 log Ω or lower under a relative humidity of 65%, and the film has a shrinkage of 3% or less in each of longitudinal and width directions after treatment with hot air at 150° C. for 30 minutes.

2. The biaxially-oriented polyester film for use as a wrap-around container label according to claim 1, wherein the number of foreign materials having a size of 1 mm or larger per 1 m² of the film is less than 1.0.

3. The biaxially-oriented polyester film for use as a wrap-around container label according to claim 1, wherein the film contains at least an alkaline earth metal compound in an amount of 20 ppm or more based on the alkaline earth metal atom and a phosphorus compound in an amount of 9 ppm or more based on the phosphorus atom.

4. The biaxially-oriented polyester film for use as a wrap-around container label according to claim 1, wherein an anionic antistatic agent having an alkyl group of 10 to 20 carbon atoms is present on at least one surface of the film.

5. The biaxially-oriented polyester film for use as a wrap-around container label according to claim 1, wherein the film further comprises an anionic antistatic agent.

6. The biaxially-oriented polyester film for use as a wrap-around container label according to claim 1, wherein the polyethylene terephthalate containing 6000 ppm or less of ethylene terephthalate cyclic trimer has a coefficient of back pressure increase of a filter of 10 or less.

7. The biaxially-oriented polyester film for use as a wrap-around container label according to claim 1, wherein the Co-b value of the film is 10 or lower.

8. A wrap-around container label produced from the biaxially-oriented polyester film according to claim 1.

9. A biaxially-oriented polyester film for use as a wrap-around container label, wherein the film comprises polyethylene terephthalate, the film has a content of polyethylene terephthalate made from recycled PET bottles of 55 wt % or more and 90 wt % or less, the film has a content of polyethylene terephthalate containing 6000 ppm or less of ethylene terephthalate cyclic trimer of 10 wt % or more, the polyethylene terephthalate containing 6000 ppm or less of ethylene terephthalate cyclic trimer is made from recycled PET bottles, the film has a content of ethylene terephthalate cyclic trimer of 6000 ppm or less, the number of foreign materials having a size of 1 mm or larger per 1 m² of the film is less than 1.0, at least one surface of the film has a surface resistivity of 13 log Ω or lower under a relative humidity of 65%, and the film has a shrinkage of 3% or less in each of longitudinal and width directions after treatment with hot air at 150° C. for 30 minutes.

10. The biaxially-oriented polyester film for use as a wrap-around container label according to claim 9, wherein an anionic antistatic agent having an alkyl group of 10 to 20 carbon atoms is present on at least one surface of the film.

11. The biaxially-oriented polyester film for use as a wrap-around container label according to claim 9, wherein the film further comprises an anionic antistatic agent.

12. The biaxially-oriented polyester film for use as a wrap-around container label according to claim 9, wherein the polyethylene terephthalate containing 6000 ppm or less of ethylene terephthalate cyclic trimer has a coefficient of back pressure increase of a filter of 10 or less.

13. The biaxially-oriented polyester film for use as a wrap-around container label according to claim 9, wherein the Co-b value of the film is 10 or lower.

14. A wrap-around container label produced from the biaxially-oriented polyester film according to claim 9.

* * * * *